United States Patent [19]
Bentley et al.

[11] Patent Number: 5,373,401
[45] Date of Patent: Dec. 13, 1994

[54] DATA STORAGE SYSTEM HAVING MULTIMODAL INTERBLOCK GAP DETECTION UTILIZING A PREDICTED OCCURANCE TIME WINDOW

[75] Inventors: Steven R. Bentley; Sushama M. Paranjape; Fernando Quintana; Stephen C. West, all of Tucson, Ariz.

[73] Assignee: International Business Machines Corporation, Armonk, N.Y.

[21] Appl. No.: 79,028

[22] Filed: Jun. 18, 1993

[51] Int. Cl.⁵ .............................................. G11B 5/09
[52] U.S. Cl. ...................................................... 360/50
[58] Field of Search ................... 360/50, 27, 48, 51, 360/61, 72.2, 72.1; 370/101; 375/112; 395/250, 275, 325, 650

[56] References Cited

U.S. PATENT DOCUMENTS

| | | | |
|---|---|---|---|
| 4,393,445 | 7/1983 | Milligan et al. | 360/72.2 |
| 4,403,286 | 9/1983 | Fry et al. | 395/650 |
| 4,423,480 | 12/1983 | Bauer et al. | 395/325 |
| 4,435,762 | 3/1984 | Milligan et al. | 395/325 |
| 4,471,457 | 9/1984 | Videki, II | 395/275 |
| 4,603,382 | 7/1986 | Cole et al. | 395/250 |

*Primary Examiner*—Donald Hajec
*Assistant Examiner*—Patrick Wamsley
*Attorney, Agent, or Firm*—D. A. Shifrin; Andrew J. Dillon

[57] ABSTRACT

A method and system for accurately reading and storing data as multiple data blocks on a removable data storage medium mounted within a data storage system. Each data block includes an initial acquisition data character and multiple diverse synchronization characters/bursts and adjacent data blocks are separated by a unique interblock gap character. A multimodal interblock gap character detection circuit is provided which may operate in a normal mode of operation or a stringent mode of operation, wherein an enhanced degree of certainty is required for detection of the interblock gap character. A predicted time window of occurrence for a next interblock gap character is generated in response to detection of an initial acquisition data character and at least one synchronization character within a data block. Additionally, a global clock count signal based upon multiple track outputs is generated each time a resynchronization burst is encountered. The multimodal interblock gap character detection circuit is then automatically switched from the stringent mode of operation to the normal mode of operation during the predicted time window, minimizing the possibility of erroneous interblock gap character detection during data block processing. In data blocks which are sufficiently large to utilize multiple unique end of block synchronization characters, the occurrence of each successive end of block synchronization character may be utilized to redefine the predicted time window with greater accuracy. Expiration of a predicted time window or the occurrence of a global clock count signal during an open predicted time window may then be utilized to generate a presumption of the occurrence of an interblock gap character; however, actual detection of the interblock gap character will override the prediction circuitry.

17 Claims, 6 Drawing Sheets

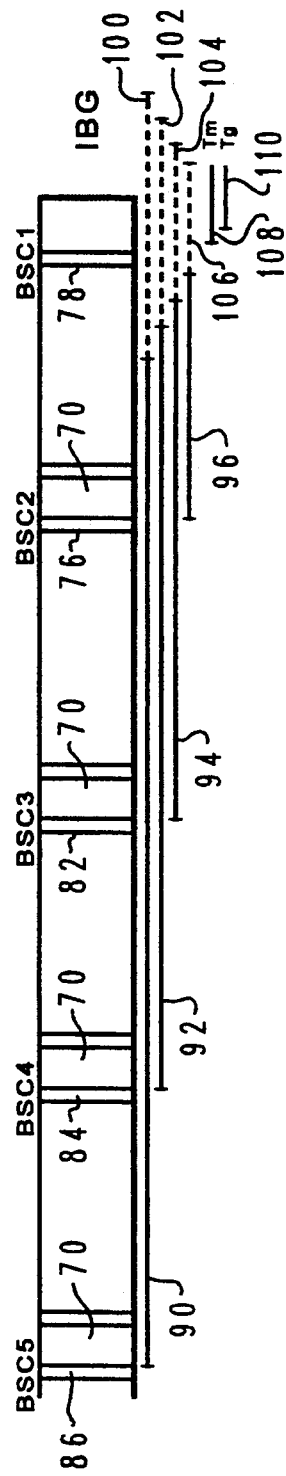
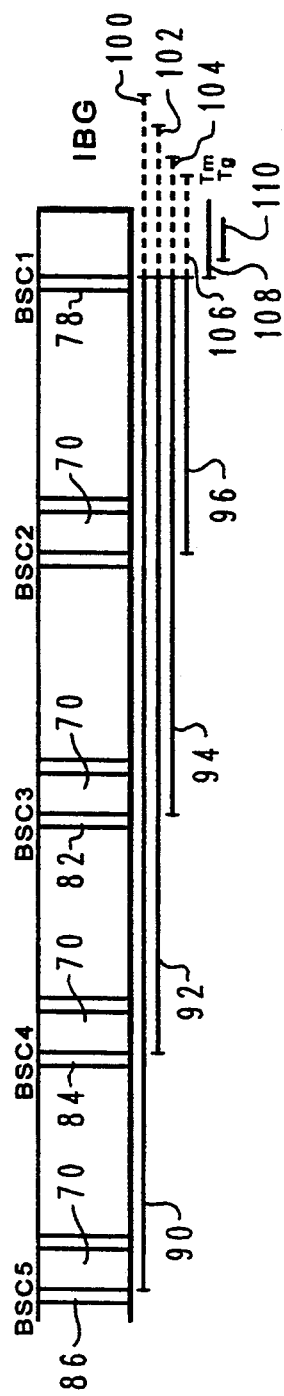
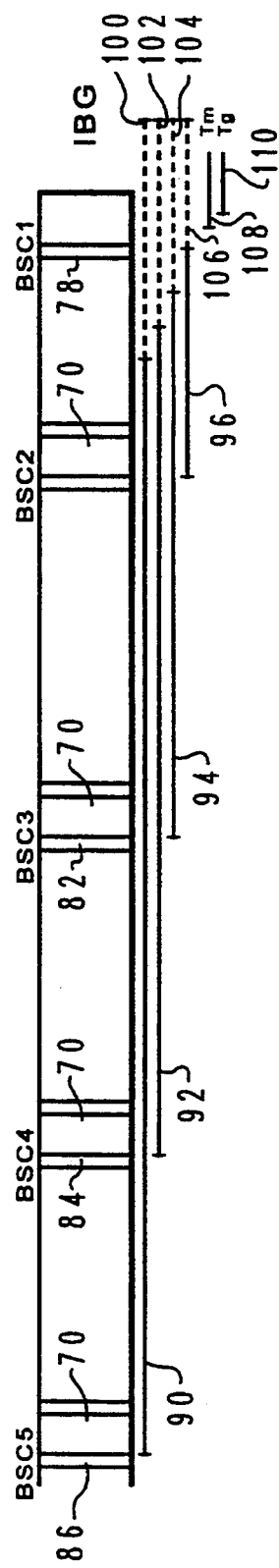
Fig. 4a
Fig. 4b
Fig. 4c

DATA STORAGE SYSTEM HAVING MULTIMODAL INTERBLOCK GAP DETECTION UTILIZING A PREDICTED OCCURANCE TIME WINDOW

BACKGROUND OF THE INVENTION

1. Technical Field

The present invention relates in general to an improved data storage system and in particular to an improved method for accurately reading and storing data blocks within a data storage system. Still more particularly the present invention relates to an improved method and system for accurately identifying the end of each data block within a data storage system.

2. Description of the Related Art

Modern data processing systems often use digital signal recording devices attached to host processors to record records as addressable units within magnetic tape storage systems.

Examples of systems which may be utilized to record records within a magnetic tape storage system are disclosed within Milligan et al., U.S. Pat. No. 4,393,445; Milligan et al., U.S. Pat. No. 4,435,762; Videki II, U.S. Pat. No. 4,471,457; Cole et al., U.S. Pat. No. 4,603,382; Bauer et al., U.S. Pat. No. 4,423,480; and Fry et al., U.S. Pat. No. 4,403,286. Each of the aforementioned patents discloses a magnetic tape storage system which may be advantageously employed in carrying out the method and system of the present invention.

In such data storage systems, it is practically a necessity that each track of data within the recording medium includes multiple synchronization characters. Such synchronization characters are necessary so that the data may be considered self-synchronizing. Without such self-synchronizing, data may not be successfully recovered. This self-synchronizing is typically accomplished by inserting various synchronization characters between small blocks or sets of data signals so that the data stored therein may be accurately and efficiently recovered.

In modern data storage systems data are typically written to multiple tracks simultaneously. When such multiple track recording is utilized it is possible to determine various necessary parameters which may affect data recovery, even though individual track data within a group of multiple tracks may be lost. One such parameter is the location of the end of a particular block of data. It is imperative to accurately identify the end of a block of data in order to prevent errors which may occur due to overwriting data when additional data are appended to a record.

Systems which have been proposed to detect the end of a data block more reliably typically use a group of diverse synchronization characters which are positioned in a unique order within a data block, such that the end of a data block may be successfully located if these synchronization characters can be detected.

It should therefore be obvious that a need exists for a method and system whereby the location and identification of the end of a data block stored within a data processing system may be accurately accomplished. Such a system should be sufficiently robust such that variations in tape speed, poorly written data blocks, poorly written interblock gap characters, or damaged or defective data blocks will not result in an inability to detect the end of a data block within the data storage system.

SUMMARY OF THE INVENTION

It is therefore one object of the present invention to provide an improved data storage system.

It is another object of the present invention to provide an improved method and system for accurately reading and storing data blocks within a data storage system.

It is yet another object of the present invention to provide an improved method and system for accurately identifying the end of each data block within a data storage system.

The foregoing objects are achieved as is now described. The method and system of the present invention may be utilized to accurately read and store data as multiple data blocks on a removable data storage medium mounted within a data storage system. Each data block includes an initial acquisition data character and multiple diverse synchronization characters/bursts and adjacent data blocks are separated by a unique interblock gap character. A multimodal interblock gap character detection circuit is provided which may operate in a normal mode of operation or a stringent mode of operation, wherein an enhanced degree of certainty is required for detection of the interblock gap character. A predicted time window of occurrence for a next interblock gap character is generated in response to detection of an initial acquisition data character and at least one synchronization character within a data block. Additionally, a global clock count signal based upon multiple track outputs is generated each time a resynchronization burst is encountered. The multimodal interblock gap character detection circuit is then automatically switched from the stringent mode of operation to the normal mode of operation during the predicted time window, minimizing the possibility of erroneous interblock gap character detection during data block processing. In data blocks which are sufficiently large to utilize multiple unique end of block synchronization characters, the occurrence of each successive end of block synchronization character may be utilized to redefine the predicted time window with greater accuracy. Expiration of a predicted time window or the occurrence of a global clock count signal during an open predicted time window may be utilized to generate a presumption of the occurrence of an interblock gap character in the absence of a detection thereof; however, actual detection of the interblock character will override the prediction circuitry.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4a–4c are pictorial representations of the predicted time windows which are utilized with the method and system of the present invention at various data rates.

DETAILED DESCRIPTION OF PREFERRED EMBODIMENT

Figure 1:
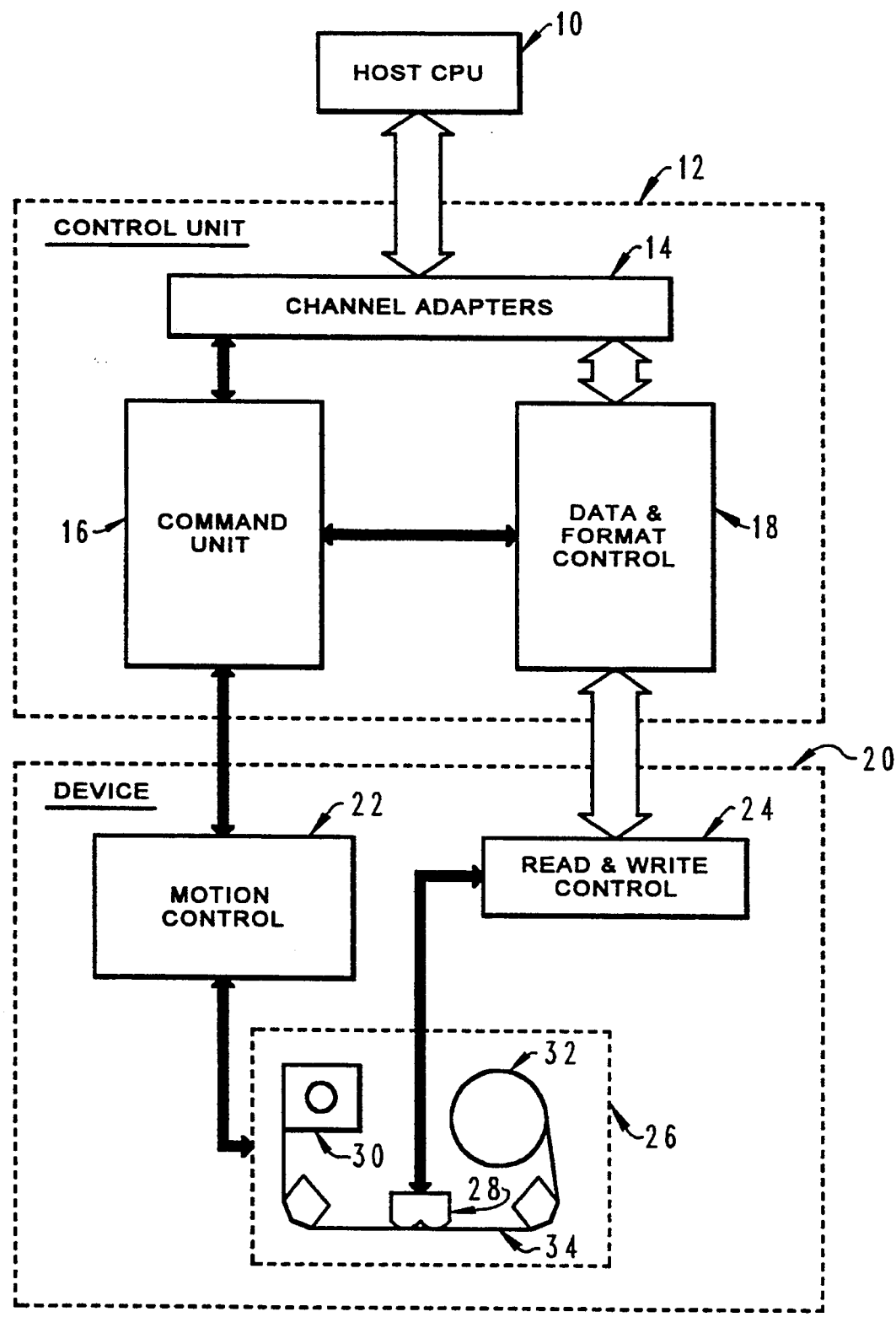
FIG. 1 is a schematic representation of a data storage system which may be utilized with the method and system of the present invention.

With reference now to the figures and in particular with reference to FIG. 1, there is depicted a schematic representation of a data storage system which may be utilized with the method and system of the present invention. As illustrated, a data processing system having a host central processing unit 10 coupled to one or more storage systems. Such storage systems may be implemented utilizing a tape storage system such as the International Business Machines Model No. 3480, 3490, or 3490E Magnetic Tape System. For ease of illustration, a single host CPU and tape storage system are depicted within FIG. 1. As illustrated, host central processing unit 10 is coupled to control unit 12 and at least one magnetic tape recording for playback device 20, and controls such devices accordingly.

As illustrated, control unit 12 includes a command unit 16 which is coupled, via channel adapters 14, to host central processing unit 10, in order to accept commands from host central processing unit 10 to control the mechanical operation of storage device 20. Command unit 16 also preferably controls the flow of data between channel adapters 14 and tape 34, via data and format control 18 and read and write control 24.

As illustrated within FIG. 1, tape storage device 20 preferably includes motion control 22, for controlling the handling of magnetic tape media, and read and write control 24, which includes both read and write circuits for operating on a magnetic transducing head 28 within tape path 26. Tape path 26 preferably includes a tape cartridge 30 having a tape supply reel therein and a tape take-up reel 32. Well known motors and control systems may be utilized for transporting magnetic tape 34 past head 28 for writing data to and reading data from tape 34. The location and prediction of an interblock gap character within the data, in accordance with the method and system of the present invention, is accomplished utilizing an end of block prediction circuit which is contained within data and format control 18 and which will be explained in greater detail herein.

Figure 2:
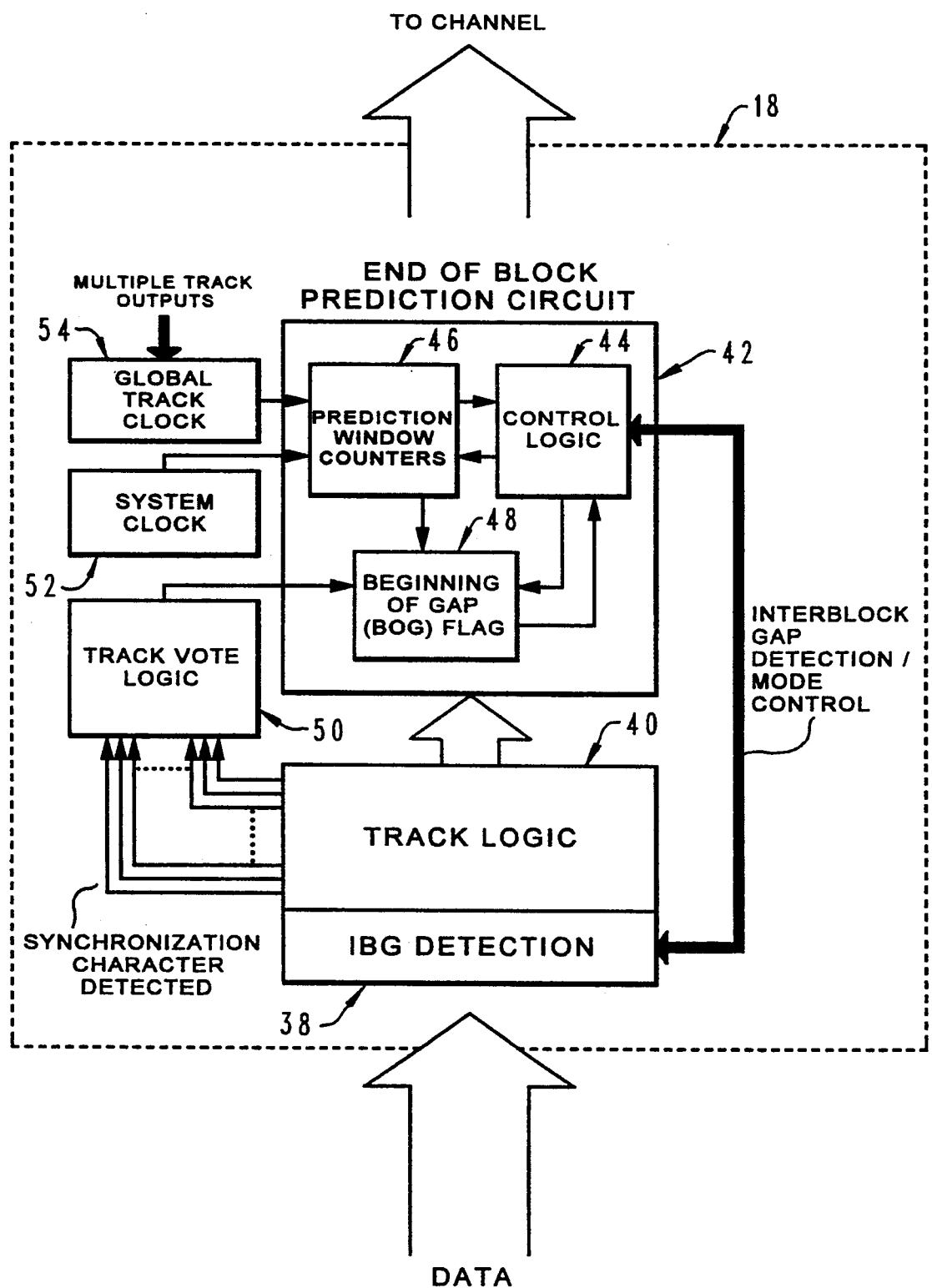
FIG. 2 is a high level block diagram of the data and format control circuitry of the data storage system of FIG. 1.

Referring now to FIG. 2, there is depicted a high level block diagram of the data and format control circuit 18 of the data storage system of FIG. 1. As illustrated, data from head 28 is coupled, via read and write control 24, to enter block gap detection circuit 38 and track logic 40. In accordance with an important feature of the present invention, interblock gap detection circuit 38 may be operated in one of multiple modes of operation in accordance with a mode control signal generated by control logic 44 of end of block prediction circuit 42, in a manner which will be explained in greater detail herein. Track logic 40 is utilized to characterize the data read by head 28 and, although not depicted within FIG. 2, to couple data read from tape 34 to host CPU, in a manner well known to those having ordinary skill in the art. The initiation of the retrieval of data from tape 34 is typically preceded by the detection of an acquisition character or acquisition "burst" which is designed to allow individual track clocks to simultaneously acquire bit synchronization for the data on each track. This acquisition character or burst is typically a repeating pattern of bytes which, when modulated and adjusted, produces a unique repeating pattern of bits which is recognized within data and format control circuit 18 as an acquisition character.

As described above, data blocks within a data storage system, such as that described herein, typically include a plurality of diverse synchronization characters which are interposed within the data in a data block. As is common in multitrack data storage systems, the detection of a synchronization character within each track is coupled to a track vote logic circuit, such as track vote logic 50 and, a synchronization character shall be designated as detected in the event a specific number of tracks within the total number of tracks within the system have detected a synchronization character. Thus, in a sixteen track data storage system, if twelve tracks detect a synchronization character, that synchronization character shall be designated as detected for purposes of explanation herein. Track vote logic 50 then outputs an indication that a synchronization character has been detected, along with the identity of the particular synchronization character for utilization by control logic 44 within end of block prediction circuit 42 in a manner which will be explained in greater detail herein.

Once processing of a data block has begun, as evidenced by detection of an acquisition character or burst, and the detection of at least one synchronization character utilizing track vote logic ,50, in accordance with an important feature of the present invention, IBG detection circuit 38 is automatically operated in a stringent mode of detection. By "stringent" mode of detection what is meant is the number of consecutive characters within an interblock gap character which must be detected in order to ascertain that an interblock gap character has occurred will be set at a higher programmable level than normal operation. In accordance with this feature of the present invention an enhanced degree of certainty of detection is therefore utilized to ensure that erroneous interblock gap character detection does not occur during processing of a data block.

Next, in a manner which will be described in greater detail herein, specific unique synchronization characters which indicate the approach of the end of a data block may be detected by track logic 40 and determined by track vote logic 50. In the described embodiment of the present invention five unique synchronization characters are provided, which each indicate the increasingly proximate occurrence of the end of a data block and the occurrence of an interblock gap character. Each time such a synchronization character is detected, end of block prediction circuit 42 sets the counters within prediction window counters 46 utilizing system clock 52 to identify a predicted time window during which occurrence of an interblock gap character is expected.

Data storage systems, such as the type disclosed herein, often permit slight variations in tape speed to accommodate such variations when transferring media from one storage system to a second storage system and thus, the predicted time window for occurrence of the interblock gap will have a duration which is calculated to accommodate the maximum and minimum data rate due to variations arising as a result of interchange. Of course, the amount of time required to initiate and terminate this predicted time window will necessarily depend upon the specific identity of the synchronization character which has been detected and its relative location with respect to the end of a data block.

Next, once a predicted time window for occurrence of an interblock gap character has opened, control logic 44, in accordance with an important feature of the present invention, automatically alters the mode of operation of interblock gap detection circuit 38 to a normal mode of operation. In a normal mode of operation, a fewer number of consecutive characters of interblock gap character are required in order to ascertain that an interblock gap character has occurred. Thus, during that period of time during which the occurrence of an interblock gap character is expected, the criteria for determining the occurrence of an interblock character is lowered, greatly enhancing the efficiency of the data storage system without incurring an increase in erroneous interblock gap character detection during data block processing.

Thereafter, in a manner which will be explained in greater detail below, the detection of an interblock gap or the termination of a predicted time window will result in the issuance of a beginning of gap "BOG" flag, indicating that the beginning of an interblock gap has been detected, permitting additional data to be appended to existing data in an accurate and efficient fashion without the possibility of overwriting existing data. Additionally, global track clock 54 is provided. Global track clock 54 is a clock which is driven by the outputs of multiple tracks within the data storage system and thus tracks nominal tape speed variations in the system. A global track clock count is also established within predicted window counter 46 each time a resynchronization character/burst occurs within the data block and this global track clock count may be utilized, as will be explained below, to presume the occurrence of an interblock gap character, despite the failure to detect one or more synchronization characters which indicate the approach of the end of a data block, if the global track clock count expires during a predicted time window. Thus, by utilizing the relatively tape speed insensitive global track clock an occurrence of interblock gap character may be presumed, with a high degree of accuracy if only a single backward synchronization character is detected prior to the end of a data block.

Figure 3:
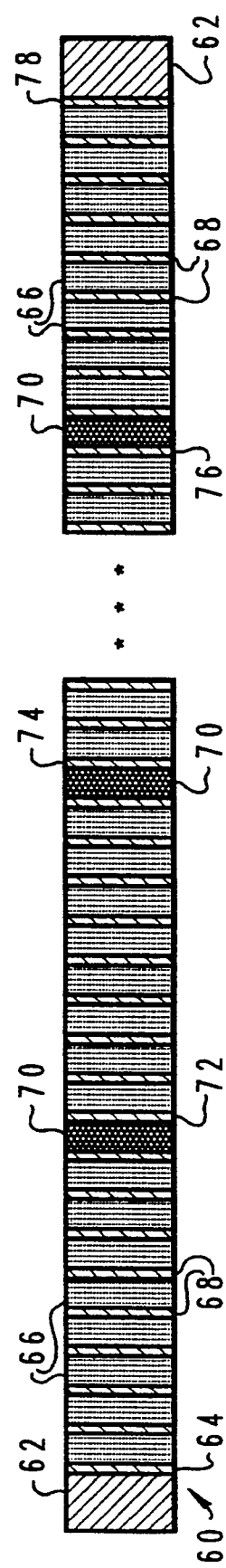
FIG. 3 is a pictorial representation of a tape data format which may be utilized with the method and system of the present invention.

With reference now to FIG. 3, there is depicted a pictorial representation of a tape data format which may be utilized with the method and system of the present invention. A data block 60 is illustrated which includes an acquisition character or burst 62. In accordance with the particular format depicted within FIG. 3, as will be described herein, each of the bursts and synchronization characters within data block 60 is symmetrical with respect to its position within the data block, such that the data may be read in either a forward or reverse direction. Thus, acquisition burst 62 is present at the beginning of data block 60 and again at the end of data block 60.

Following acquisition burst 62 is a unique synchronization character, forward synchronization character FSC1 (FSC1) which is utilized to indicate the beginning of a data block. Thereafter, eight data segments 66 follow, each separated by a common resynchronization character 68. Next, a resynchronization burst 70 is provided to allow individual track read clocks to reacquire bit synchronization within a physical block and to reset the global track clock count described above. Since these resynchronization bursts 70 are designed to permit individual tracks to resynchronize, there is no requirement that all tracks read these resynchronization bursts simultaneously. Thus, resynchronization burst 70 is typically a shorter pattern than acquisition burst 62. As illustrated, each resynchronization burst 70 is followed by a Forward Synchronization Character and preceded by a Backward Synchronization Character.

Next, a second unique synchronization character, Forward Synchronization Character 2 (FSC2) 72 occurs following resynchronization burst 70. Similarly, a third unique synchronization character, Forward Synchronization Character 3 (FSC3) 74 follows the next resynchronization burst 70. In the depicted embodiment of the present invention up to five unique Forward Synchronization Characters are defined in a manner which supports the ability of the system to read data in both the forward and backward direction. These five unique Forward Synchronization Characters and five unique Backward Synchronization Characters provide information regarding the proximity of the beginning or end of a physical block of data. The Backward Synchronization Characters, as will be explained herein, are numbered beginning at the end of a physical block and are defined to be the exact inverse of their counterparts.

As a result, the exact same sequence of synchronization characters will be detected within a data block regardless of the direction in which the physical block is read. Additionally, a determination of relative position within the physical data block may be determined by determining the particular synchronization character being read. Thus, if one of the aforementioned unique Forward Synchronization Characters is being read, the reader is near the beginning of a data block. Similarly, if one of the unique Backward Synchronization Characters is being read, the reader is near the end of a physical block. This relationship is true regardless of the direction in which the block is being read as a result of the inverse nature of these synchronization characters.

Thus, at the end of data block 60, a unique Backward Synchronization Character 2 (BSC2) 76 is provided adjacent to resynchronization burst 70. Similarly, Backward Synchronization Character 1 (BSC1) 78 is provided immediately preceding acquisition burst 62. Thus, it may be seen that these unique synchronization characters may be utilized to determine the relative position of the reader within the data block with respect to either end of the data block. Of course, the relative size of a data block in a system which permits variably sized data blocks may accommodate a greater or lesser number of such unique synchronization characters; however, each data block will include at least a single unique Forward Synchronization Character and a single Backward Synchronization Character.

Referring now to FIGS. 4a–c, there are depicted pictorial representations of the predicted time windows which may be utilized with the method and system of the present invention to detect or assume the occurrence of an interblock gap character at various data rates. Referring initially to FIG. 4a, a pictorial representation of the predicted time windows for occurrence of an interblock gap are illustrated for a nominal data rate scenario. As illustrated, a data block having sufficient size to accommodate five unique Backward Synchronization Characters is depicted. As illustrated, upon the occurrence of the detection of Backward Synchronization Character 5 (BSC5) 86, a BSC5 predict line 90 is illustrated. This line begins following the occurrence of BSC5 and includes BSC5 prediction window 100 which represents that predicted time period during which occurrence of an interblock gap character is expected. The duration of BSC5 prediction window 100 is, of course, calculated to account for variations in data rate which may occur as a result of interchange. It is during the occurrence of BSC5 prediction window 100 that the mode of operation of IBG detection circuit 38 is automatically altered to a normal or nonstringent mode of operation, making it easier to detect an interblock gap character during this window. Similarly, an occurrence of the detection of Backward Synchronization Character 4 (BSC4) 84 will result in the occurrence of BSC4 prediction line 92 and a superseding prediction window, BSC4 prediction window 102. As illustrated, the duration of BSC4 prediction window 102 is slightly less than the duration of BSC5 prediction window 100, due to the fact that less time will be available for tape speed variations to occur in a like manner, the detection of Backward Synchronization Character 3 (BSC3) 82 and Backward Synchronization Character 2 (BSC2) 76 will similarly result in the generation of a superseding prediction window 102 and 104 respectively. Thus, upon reference to FIG. 4a, those skilled in the art will appreciate that the detection of the occurrence of any of the unique Backward Synchronization Characters will result in the initiation of a prediction window during which the occurrence of an interblock gap character should be detected.

As noted, the detection of Backward Synchronization Character 1 (BSC1) 78 may occur after the initiation of a prediction window. However, since Backward Synchronization Character 1 (BSC1) 78 occurs in the closest proximity to the interblock gap character, a separate time out circuit is provided for determining the maximum period of time beyond the detection of Backward Synchronization Character 1 (BSC1) 78 which will be permitted without the detection of the interblock gap character. This prediction window is illustrated at reference numeral 108 and referred to as "Tin."

Finally, in accordance with an important feature of the present invention, a global track clock count is established each time a resynchronization burst occurs within data block 60 (see FIG. 3). This global track clock count is calculated to expire following a subsequent resynchronization burst. Since this count is based upon the output of global track clock 54, it is highly accurate and tracks tape speed variations and may be utilized to initiate a predicted occurrence of an interblock gap character, despite the failure of the system to detect more than one preceding backward synchronization character, so long as a resynchronization burst has been detected. Thus, if this global track clock count expires during an open prediction window, an occurrence of an interblock gap character may be presumed, in the absence of an actual detection of an interblock gap character. As indicated at reference numeral 110, the expiration of a short period following this count, indicated at "Tg," will result in the presumption an interblock character, in the event an interblock character has not been detected.

Referring now to FIGS. 4b and 4c, the predicted time windows are illustrated for maximum and minimum variations in interchange data rate, respectively. As illustrated, the detection of each Backward Synchronization Character still results in the generation of a predicted time window during which an interblock gap character occurrence is expected. As depicted, the duration of each prediction window associated with a backward synchronization character has been calculated such that the expiration of each predicted time window will occur during that period of time when an occurrence of an interblock gap character should be detected, despite variations in data interchange rate which may occur.

Figure 5A:
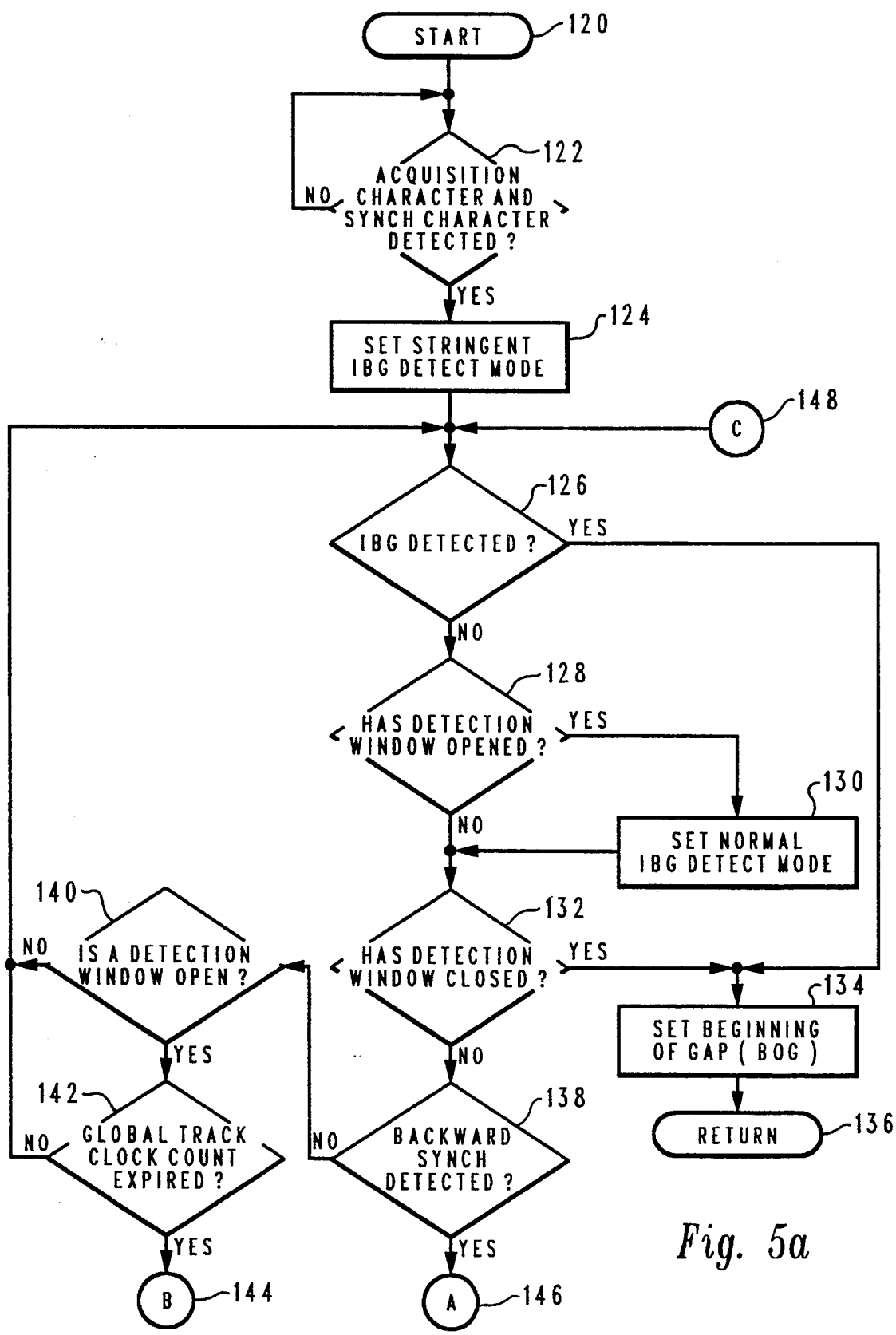
FIGS. 5a–5b together form a high level logic flowchart illustrating the method and system of the present invention.
Figure 5B:
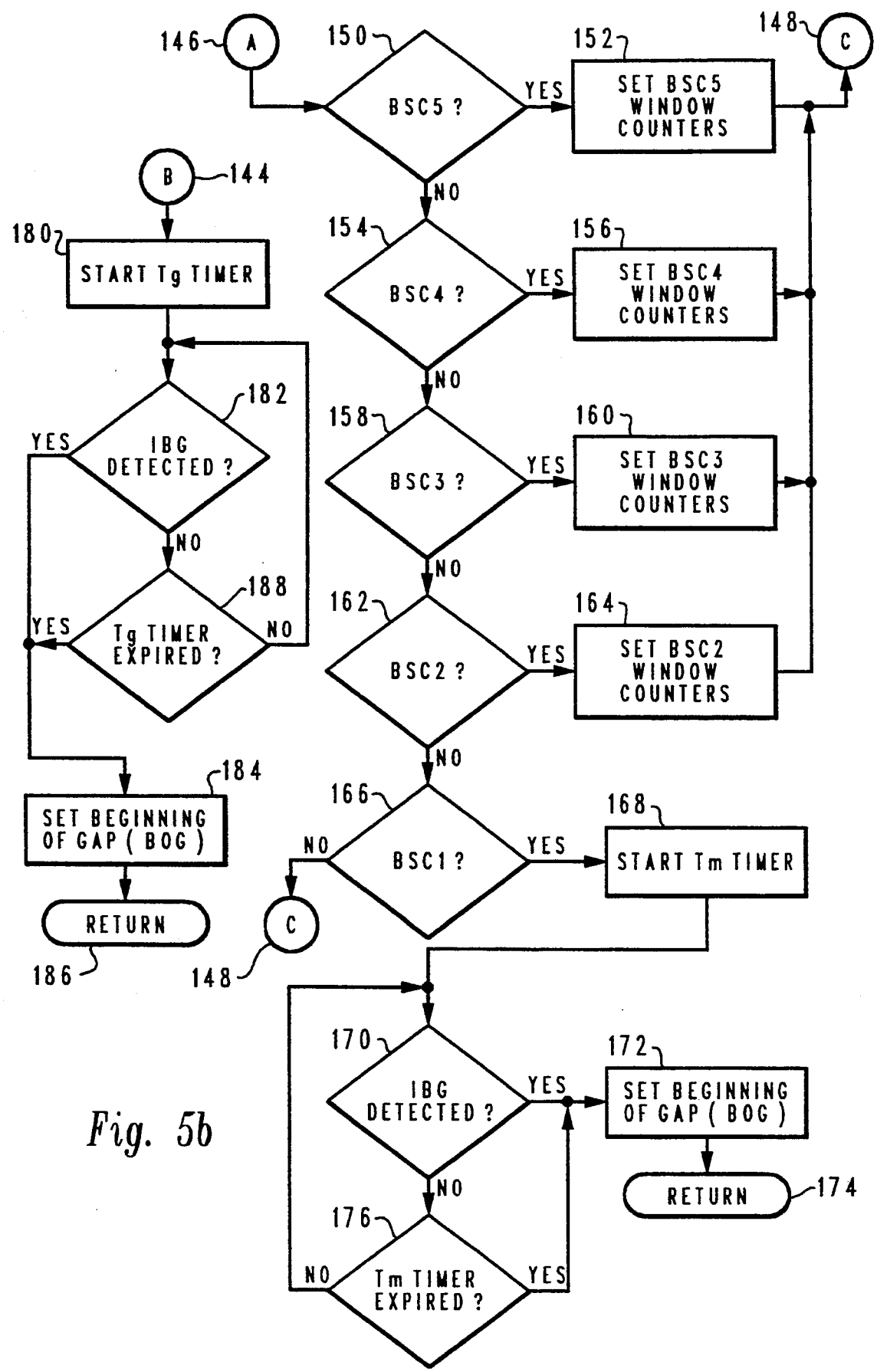

Finally, with reference to FIGS. 5a and 5b, there is depicted a high level logic flowchart which illustrates the method of the present invention. As depicted, the process begins at block 120 and thereafter passes to block 122. Block 122 illustrates a determination of whether or not an acquisition character or burst and at least one synchronization character have been detected. As described above, this situation indicates the initiation of data block processing and, in accordance with an important feature of the present invention, is utilized to set the IBG detection circuit to a stringent mode of detection. In the event an acquisition character and at least one synchronization character have not been detected, the process merely iterates until such time as data block processing is initiated.

Once data block processing has been initiated, block 124 illustrates the setting of the interblock gap character detection mode to a stringent mode of operation. As described above, the stringent mode of operation requires a greater consecutive number of characters of interblock gap character nature to be detected in order to assure a higher degree of certainty of detection. Those skilled in the art will appreciate that an interblock character may comprise a segment of erased tape, a tone or other data pattern outside the normal data characteristics of the system.

Next, the process passes to block 126. Block 126 illustrates a determination of whether or not an interblock gap character has been detected. Of course, initially this detection must occur during a stringent detection mode of operation. In the event an interblock gap character detection has occurred, the process passes to block 134. Block 134 illustrates the setting of the beginning of gap (BOG) flag, indicating that the end of the block has occurred and the process then passes to block 136 and returns.

Referring again to block 126, in the event the interblock gap character has not been detected, the process passes to block 128. Block 128 illustrates a determination of whether or not a detection prediction window has opened, as a result of the passage of time following the detection of a backward synchronization character in the manner described with respect to FIGS. 4a-c. In the event a detection prediction window has opened, the process passes to block 130. Block 130 illustrates the setting of the normal interblock gap character detection mode, requiring detection of a lesser number of consecutive interblock gap characters to determine the occurrence of an interblock gap character. Thereafter, or in the event a detection prediction window has not been opened, the process passes to block 132. Block 132 illustrates a determination of whether or not a detection prediction window has closed. If so, the period of time during which an interblock gap character should have been detected has passed without the detection of an interblock gap character. Thereafter, the process passes again to block 134 which illustrates the setting of the beginning of gap (BOG) flag, based upon the presumption that an interblock gap character has occurred, despite the failure of the system to detect it. Thereafter, the process passes to block 136 and returns.

Of course, those skilled in the art will appreciate that various administrative functions may be accomplished based upon whether or not the beginning of gap (BOG) flag was set as a result of an actual detection of an interblock gap character or a presumed occurrence thereof. However, for purposes of illustration of the present invention, no discrimination is described.

Referring again to block 132, in the event a detection prediction window has not closed, the process passes to block 138. Block 138 illustrates a determination of whether or not a Backward Synchronization Character has been detected. In the event a Backward Synchronization Character has not been detected, the process passes to block 140. Block 140 illustrates a determination of whether or not a detection prediction window is open and if not, the process merely returns in an iterative fashion to block 136 to determine whether or not an interblock gap character has been detected. Referring again to block 140, in the event a detection prediction window is opened, the process passes to block 142. Block 142 illustrates a determination of whether or not the global track clock count has expired and if not, the process once again returns in an iterative fashion to block 126, as described above.

In the event the global track clock count has expired, as indicated at block 142, or in the event a Backward Synchronization Character has been detected, as indicated at block 138, the process passes from FIG. 5a to FIG. 5b via interpage connectors 144 and 146 respectively.

Referring now to FIG. 5b, in the event a Backward Synchronization Character has been detected, the process passes from interpage connector 146 to block 150. Block 150 illustrates a determination of whether or not the Backward Synchronization Character detected is BSC5. If so, the process passes to block 152 which illustrates the setting of the BSC5 window counters within prediction window counters 46 of end of block prediction circuit 42 (see FIG. 2). Thereafter, the process returns to block 126 of FIG. 5a via connector 148. In a similar fashion, in the event the Backward Synchronization Character detected is not BSC5, the process passes to blocks 154, 158 and 162, each block determining the identity of a particular Backward Synchronization Character. In the event BSC4, BSC3, or BSC2 have been detected, the process will pass to block 156, 160 or 164 to set the appropriate counter and then return to block 126 via connector 148 as illustrated.

Referring again briefly to block 142, in the event a detection prediction window is open and the global track clock count has expired, indicating that the resynchronization burst preceding Backward Synchronization Character 1 (BSC1) has occurred, the process passes via connector 144 to block 180. Block 180 illustrates the starting of the "Tg" timer. The "Tg" timer is driven, as described above, utilizing global track clock 54 and is thus relatively insensitive to tape speed variations. This timer is then utilized to presume the occurrence of an interblock gap character, in the event Backward Synchronization Character 1 (BSC1) has not been detected. Once this timer has been started, opening prediction window 110 (see FIG. 4a) the process passes to block 182. Block 182 illustrates a determination of whether or not an interblock gap character has been detected and if so, the process passes to block 184. Block 184 illustrates the setting of the beginning of gap (BOG) flag and the process then passes to block 186 and returns.

Referring again to block 182, in the event an interblock gap character has not been detected, the process passes to block 188. Block 188 illustrates a determination of whether or not the "Tg" timer has expired and if not, the process returns, in an iterative fashion, to block 182. However, if the "Tg" timer has expired, the process passes to block 184. As above, the expiration of this timer indicates that the system has failed to detect the interblock gap character and an occurrence thereof is then presumed, and the beginning of gap (BOG) flag is set, as depicted at block 184. Thereafter, the process passes to block 186 and returns.

Referring now to block 166, in the event a Backward Synchronization Character has occurred, and block 166 illustrates a determination of whether or not that character is Backward Synchronization Character 1 (BSC1). If not, the process returns to block 126 via connector 148, in the manner illustrated. However, in the event the BSC1 backward synchronization character has been detected, the process passes to block 168. Block 168 illustrates the starting of the "Tm" timer, a system clock timer which is initiated upon the occurrence of the detection of Backward Synchronization Character 1 (BSC1) 78 (see FIGS. 4a–c). Thereafter, the process the passes to block 170. Once again, block 170 illustrates a determination of whether or not an interblock gap character has been detected during the predicted time window represented by the Tm timer. This time window is illustrated at reference numeral 108 in FIGS. 4a–c. If an interblock gap character is detected, the process passes from block 170 to block 172 which depicts the setting of the beginning of gap (BOG) flag and the process then passes to block 174 and returns.

Referring again to block 170 in the event an interblock gap character has not been detected the process passes to block 176. Block 176 illustrates a determination of whether or not the "Tm" timer has expired and if not, the process returns in an iterative fashion to block 170. However, in the event the "Tin" timer has expired, the process passes to block 172 to set the beginning of gap (BOG) flag, based upon the presumption of the occurrence of an interblock gap character, despite the failure of detection thereof. Thereafter, the process passes to block 174 and returns.

Upon reference to the foregoing those skilled in the art will appreciate that the Applicants herein have described a system whereby the end of a data block within a data storage system may be accurately determined utilizing a multimodal interblock gap detection circuit which incorporates a series of predicted time windows and timer counts to detect or pressure the occurrence of the interblock gap character.

While the invention has been particularly shown and described with reference to a preferred embodiment, it will be understood by those skilled in the art that various changes in form and detail may be made therein without departing from the spirit and scope of the invention.

We claim:

1. A storage system for accurately storing and reading data stored as multiple data blocks on a removable data storage medium mounted therein, each data block including an initial acquisition data character and multiple diverse synchronization characters disposed therein in an order determined in accordance with a predicted format identification, each data block separated from an adjacent data block by a unique interblock gap character, said system comprising:

a transducing head;

means for moving said removable data storage medium relative to said transducing head;

means for controlling said transducing head to store and read data on said removable data storage medium;

a multimode interblock gap character detection circuit coupled to said transducing head for detecting occurrences of said interblock gap character, said multimode interblock gap character detection circuit having a normal mode of operation and a stringent mode of operation, said stringent mode of operation requiring an enhanced degree of certainty of detection;

a clock circuit;

an end of block prediction circuit coupled to said clock circuit and said transducing head for generating a predicted time window for occurrence of an interblock gap character in response to detection of at least one synchronization character; and logic control circuitry coupled to said end of block prediction circuit and said multimode interblock gap character detection circuit for automatically switching said multimode interblock gap character detection circuit from said stringent mode of operation to said normal mode of operation during said predicted time window wherein erroneous detection of an interblock gap character during data block processing is minimized.

2. The storage system for accurately storing and reading data according to claim 1, wherein said end of block prediction circuit generates a superseding predicted time window within a preceding predicted time window in response to detection of a subsequent synchronization character within said data block.

3. The storage system for accurately storing and reading data according to claim 1, further including means for closing said predicted time window in response to actual detection of an occurrence of an interblock gap character.

4. The storage system for accurately storing and reading data according to claim 1, further including a time out circuit for generating an indication of an interblock gap character in response to a failure to detect an interblock gap character within said predicted time window.

5. The storage system for accurately storing and reading data according to claim 1, wherein said interblock gap character comprises a series of selected characters and wherein said multimodal interblock gap character detection circuit detects an occurrence of an interblock gap character in response to detection of a series of M selected characters when operating in normal mode of operation and in response to detection of a series of N selected characters while operating in a stringent mode of operation, wherein N is greater than M.

6. The storage system for accurately storing and reading data according to claim 4, wherein each data block includes a unique end of block synchronization character preceding said interblock gap character and wherein said time out circuit generates an indication of an interblock gap character after expiration of a predetermined period of time following said unique end of block synchronization character in response to a failure to detect said interblock gap character prior to expiration of said predetermined period of time.

7. The storage system for accurately storing and reading data according to claim 1, wherein a duration of said predicted time window is based upon a maximum and minimum speed variation in moving said removable data storage medium relative to said transducer head.

8. A method for accurately reading data stored within a data storage system as multiple data blocks on a removable data storage medium mounted within said data storage system, each data block including an initial acquisition data character and multiple diverse synchronization characters disposed therein in an order determined in accordance with a predicted format identification, each data block separated from an adjacent data block by a unique interblock gap character, said method comprising the steps of:

reading data on said removable data storage medium;

detecting an initial acquisition data character and at least one synchronization character for a data block within said data;

generating a predicted time window for occurrence of an interblock gap character in response to said detecting of at least one synchronization character within said data block; and examining said data to detect an occurrence of an interblock gap character utilizing a first criterion during said predicted time window and a second criterion at other times, said second criterion being more stringent than said first criterion wherein erroneous detection of an interblock gap character during data block processing is minimized.

9. The method for accurately storing and reading data according to claim 8, further including the step of generating a superseding predicted time window within a preceding predicted time window in response to detection of a subsequent synchronization character within said data block.

10. The storage system for accurately storing and reading data according to claim 8, further including the step of presuming the occurrence of an interblock gap character in response to a failure to detect an interblock gap character during said predicted time window.

11. The storage system for accurately storing and reading data according to claim 8, further including the step of closing said predicted time window in response to actual detection of an occurrence of said interblock gap character.

12. The storage system for accurately storing and reading data according to claim 8, further including the step of varying a duration of said predicted time window in response to permitted variations in data rate during reading of said data.

13. A storage system for accurately storing and reading data stored as multiple data blocks on a removable data storage medium mounted therein, each data block including an initial acquisition data character, periodic reacquisition bursts and multiple diverse synchronization characters disposed therein in an order determined in accordance with a predicted format identification, each data block separate from an adjacent data block by a unique interblock gap character, said system comprising:

a transducing head;

means for moving said removable data storage medium relative to said transducing head;

means for controlling said transducing head to store and read data on said removable data storage medium;

a global track clock circuit for initiating a global track clock count in response to each detection of a periodic resynchronization burst;

an end of block prediction circuit coupled to said transducing head for generating a predicted time window for occurrence of an interblock gap character in response to detection of at least one synchronization character; and logic control circuitry coupled to said end of block prediction circuit and said global track clock circuit for generating an indication of said interblock gap character in response to expiration of said global track clock count within said predicted time window, in an absence of actual detection of an interblock gap character.

14. The storage system for accurately storing and reading data according to claim 13, wherein said end of block prediction circuit generates a superseding predicted time window within a preceding predicted time window in response to detection of a subsequent synchronization character within said data block.

15. The storage system for accurately storing and reading data according to claim 13, further including means for closing said predicted time window in response to actual detection of an occurrence of an interblock gap character.

16. The storage system for accurately storing and reading data according to claim 13, wherein said system includes a system clock timer and wherein each data block includes a unique end of block synchronization character preceding said interblock gap character and wherein said system clock timer generates an indication of an interblock gap character after expiration of a predetermined period of time following said unique end of block synchronization character in response to a failure to detect said interblock gap character prior to expiration of said predetermined period of time.

17. The storage system for accurately storing and reading data according to claim 13, wherein a duration of said predicted time window is based upon a maximum and minimum speed variation in moving said removable data storage medium relative to said transducer head.

* * * * *